US008192046B2

(12) United States Patent
Huang

(10) Patent No.: US 8,192,046 B2
(45) Date of Patent: Jun. 5, 2012

(54) LIGHT SOURCE APPARATUS WITH COLOR COMBINING ELEMENT

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 595 days.

(21) Appl. No.: 12/257,426

(22) Filed: Oct. 24, 2008

(65) Prior Publication Data

US 2009/0303707 A1 Dec. 10, 2009

(30) Foreign Application Priority Data

Jun. 4, 2008 (TW) .............................. 97120757 A

(51) Int. Cl.
*F21V 7/04* (2006.01)
*H01P 5/00* (2006.01)
*G02B 5/02* (2006.01)
(52) U.S. Cl. .... 362/231; 362/237; 362/561; 362/249.02
(58) Field of Classification Search .................. 362/555, 362/561, 574, 511, 543, 544, 545, 231, 236, 362/237, 240, 249.02
See application file for complete search history.

(56) References Cited

U.S. PATENT DOCUMENTS

| 6,547,421 | B2 * | 4/2003 | Sugano ........................... 362/268 |
|---|---|---|---|
| 7,270,425 | B2 * | 9/2007 | Arai et al. ......................... 353/87 |
| 7,311,403 | B2 * | 12/2007 | Yoshii et al. ...................... 353/31 |
| 7,384,151 | B2 * | 6/2008 | Seki ................................. 353/52 |
| 7,575,340 | B2 * | 8/2009 | Kung et al. ...................... 362/231 |
| 7,766,490 | B2 * | 8/2010 | Harbers et al. .................. 353/94 |
| 7,766,507 | B2 * | 8/2010 | Nakajima ........................ 362/237 |
| 2005/0190562 | A1 * | 9/2005 | Keuper et al. ................... 362/325 |
| 2005/0200812 | A1 * | 9/2005 | Sakata et al. ..................... 353/20 |
| 2005/0201107 | A1 * | 9/2005 | Seki ................................. 362/373 |
| 2005/0219464 | A1 * | 10/2005 | Yamasaki et al. ................ 353/20 |
| 2006/0023167 | A1 | 2/2006 | Chiang et al. |
| 2007/0132962 | A1 | 6/2007 | Kitamura |
| 2007/0195278 | A1 | 8/2007 | Yokote et al. |
| 2007/0297170 | A1 * | 12/2007 | Tatsuno ........................ 362/227 |
| 2009/0284965 | A1 * | 11/2009 | Zheng et al. ................... 362/231 |

OTHER PUBLICATIONS

Office Action from corresponding Chinese Application No. 200810125913.0 dated May 11, 2010. English machine translation attached.

* cited by examiner

*Primary Examiner* — Ismael Negron
(74) *Attorney, Agent, or Firm* — Grossman, Tucker, Perreault & Pfleger, PLLC

(57) ABSTRACT

A light source apparatus includes at least one light source and a light source transforming apparatus. The light source transforming apparatus includes at least one light guiding medium and color-combining medium. The light source transforming apparatus is configured to receive incident light of the at least one light source and then transform the incident light into emergent light emitted from the color-combining medium and into a light integrator, wherein a divergent angle of the incident light is larger than a divergent angle of the emergent light, and a incident area of the light source is smaller than an emergent area of the color-combining medium.

21 Claims, 3 Drawing Sheets

LIGHT SOURCE APPARATUS WITH COLOR COMBINING ELEMENT

This application claims priority to Taiwan Patent Application No. 097120757 filed on Jun. 4, 2008, the disclosure of which is incorporated herein by reference in its entirety.

CROSS-REFERENCES TO RELATED APPLICATIONS

Not applicable.

BACKGROUND OF THE INVENTION

1. Field of the Invention

The present invention relates to a light source apparatus, and more particularly, relates to a light source apparatus for use in a projection apparatus.

2. Descriptions of the Related Art

Recent years, due to the advancement of technologies for manufacturing projection apparatuses, the light and compact projection apparatuses have become the mainstream product in the market. Driven by the ever-changing demand of the market, the projection apparatuses must be continuously improved in design and accordingly, the projection apparatus manufacturers must develop projection apparatuses with small profile, high efficiency and good image quality to meet the market demand.

Conventionally, projection apparatuses use ultra high performance (UHP) lamp as a light source. As LED technology make great progress, projection apparatuses have gradually begun to use LED instead of the UHP lamp as the light source. LEDs have many advantages such as long life, instant on and wide color gamut, etc. Therefore, efforts have been made in the art to employ LEDs as the light source. For example, a technology that employs a plurality of LEDs as the light source in a projection apparatus is disclosed in U.S. Patent Publication No. 2006/0023167. With this technology, a difficult method is required to collect light from the plurality of LEDs.

Other solution of the prior art uses single LED for one color of light source to simplify the structure of LED light source. For example, U.S. Patent Publication No. 2007/0195278 discloses a technology that employs three colors of single LED. However, this technology only applies to three-panel optical engine. For one-panel engine, light beams with three colors emitted by LED are required to combine and sent to a common integration rod. To overcome these drawbacks, various optical structures have been proposed in an attempt to improve the utilization efficiency of the light source and solve the congenital problem of LED light source causing the large divergent angle. However, optical structures currently available are rather complex in design, and the space required increases the size of the projection apparatus. On the other hand, efficient heat dissipation is needed because poor heat dissipation may cause an abrupt deterioration in the light emitting efficiency of the LEDs. Accordingly, as the sizes of projection apparatuses have decreased, and thus have less internal space, it is important to increase the heat dissipation efficiency of the light source.

In view of these problems confronted by miniaturized projection apparatuses, it is highly desirable in the art to provide a light source apparatus for use in a projection apparatus that has improved light source utilization efficiency, heat dissipation efficiency and a miniaturized profile.

SUMMARY OF THE INVENTION

One objective of this invention is to provide a light source apparatus for use in a projection apparatus to accomplish the miniaturization of the projection apparatus.

This invention provides a light source apparatus, which comprises at least one light source, at least one light guiding medium and a color-combining medium. The light source can be represented by a first light and a second light. The light guiding medium has an incident surface, a first light guiding surface and a second light guiding surface. The incident surface is configured to be adjacent to the light source. The first and second light enters the light guiding medium from the incident surface. In addition, via the first light guiding surface, a third light and a fourth light are emitted from the second light guiding surface. The color-combining medium has at least one color-combining incident surface and one color-combining emergent surface. A color-combining focus is formed on the color-combining emergent surface after the third light enters the color-combining medium from the color-combining incident surface, and a fifth light is emitted from the color-combining focus. The fourth light is emitted into the color-combining medium from the color-combining incident surface, and a sixth light is emitted from the color-combining emergent surface.

The light source apparatus of this invention further comprises a heat-dissipating module, which comprises a base and a heat-dissipating platform. The base has an annular structure adapted to define a containing space. The light source is configured on the base, and the color-combining medium is configured in the containing space. Additionally, the base is configured on the heat-dissipating platform. The base transfers the heat generated by the light source to the heat-dissipating platform and further to the outside through the heat-dissipating platform.

Another objective of this invention is to provide a light source transforming apparatus. The light source transforming apparatus is adapted to, in a limited space, transform an incident light with a large divergent angle into an emergent light with a small divergent angle. This may accomplish the miniaturization of the projection apparatus and improve the utilization efficiency of the light source.

This invention provides a light source transforming apparatus, which is adapted to receive an incident light from a light source and then transform the incident light to be emitted into a light integration apparatus. The incident light has an incident divergent angle from an incident area of the light source. The light source transforming apparatus comprises a light guiding medium and a color-combining medium. The light guiding medium is adjacent to the light source and configured to receive and guide the incident light. The color-combining medium is adjacent to the light guiding medium, and has a color-combining incident surface and a color-combining emergent surface. The color-combining incident surface is attached to the light guiding medium. The incident light guided by the light guiding medium is emitted to the color-combining incident surface, and an emergent light is emitted from the color-combining emergent surface before entering the light integration apparatus. The emergent light has an emergent divergent angle, while the color-combining emergent surface has an emergent area, in which the incident divergent angle is greater than the emergent divergent angle and the incident area is smaller than the emergent area.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
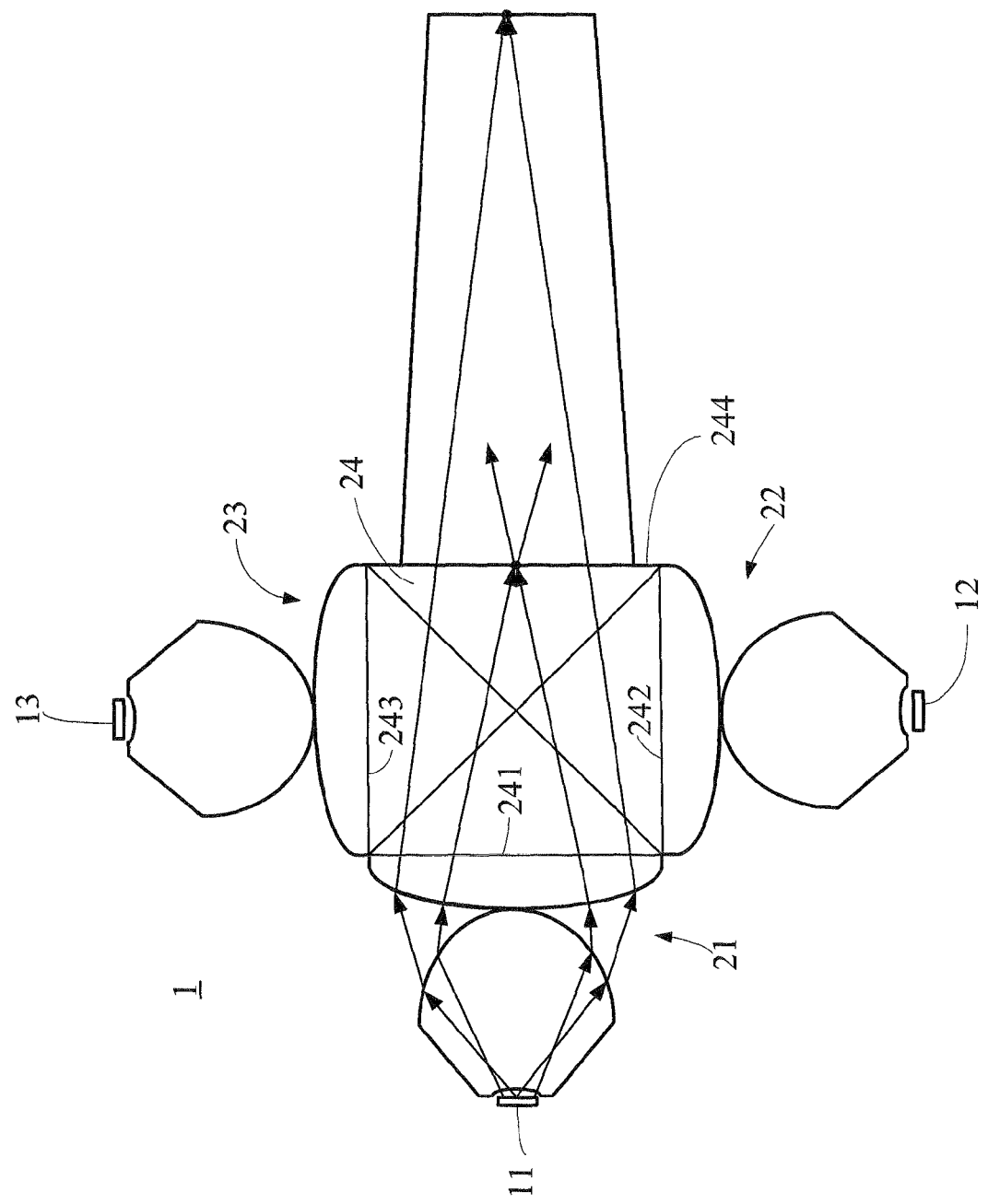
FIG. 1 is a schematic view of the preferred embodiment of a light source apparatus according to this invention.

In the following embodiments and the attached drawings, elements not related directly to this invention are omitted from depiction, and for ease of understanding, dimensional relationships among individual elements are depicted in an exaggerative way. Furthermore, in the attached drawings, elements at locations symmetric with each other represent elements with the same features, and for simplicity of the drawings and for convenience of description, identical reference numerals will not be repeated.

This invention provides a light source apparatus for use in an imaging apparatus, and particularly a light source apparatus for use in a projection apparatus. The light source apparatus comprises at least one light source and a light source transforming apparatus. As shown in FIG. 1, the light source apparatus 1 in this embodiment comprises three light sources 11, 12, 13 and a light source transforming apparatus. Here, the light source 11 is a green light source, the light source 12 is a blue light source, and the light source 13 is a red light source, all of which are configured to provide an incident light. The light source transforming apparatus comprises at least one light guiding medium. In this embodiment, the light source transforming apparatus comprises three light guiding media 21, 22, 23 disposed at locations corresponding to the light sources 11, 12, 13 respectively. Additionally, the light source transforming apparatus further comprises a color-combining medium 24 disposed among the three light guiding media 21, 22, 23. In this embodiment, the color-combining medium 24 is a dichroic mirror which, in turn, may be a color-combining prism or an X-cube. However, the dichroic mirror is not merely limited thereto. For example, the dichroic mirror may also be an X-plate. The light source transforming apparatus of this invention primarily converges the light provided by the light sources within a limited space and then transforms the light into an emergent light to be emitted from the light source transforming apparatus. As a result, the utilization efficiency of the light sources is improved as the volume of the projection apparatus is miniaturized.

In this embodiment, each of the light sources 11, 12, 13 is an LED with a small volume instead of a large conventional bulb, although they are not limited thereto. For example, other miniaturized light emitting devices may also be used as light sources in this invention to shrink the volume of the imaging apparatus.

It should be noted that the light emitted by the aforesaid miniaturized LEDs exhibits a large divergent angle which actually has a range of about 120° (i.e., −60° to 60°), so if no appropriately configured light collecting mechanism were provided, light sources formed by LEDs or the like elements would have a poor utilization efficiency of light. In contrast, the light source transforming apparatus of this invention is adapted to transform such a light source exhibiting a large divergent angle into a light source that exhibits a small divergent angle with a range of about 24° (i.e., −12° to 12°) to improve the utilization efficiency of the light source. This will be detailed as follows.

For this embodiment, the light source transforming apparatus of this invention comprises three light guiding media 21, 22, 23 and a color-combining medium 24. In particular, the light guiding media 21, 22, 23 are disposed between the color-combining medium 24 and a corresponding light source 11, 12, 13. In particular, the color-combining medium 24 has three color-combining incident surfaces 241, 242, 243 and a color-combining emergent surface 244. Each of the three light guiding media 21, 22, 23 works in conjunction with one of the color-combining incident surfaces 241, 242, 243 and furthermore, a portion of the light guiding medium 21 is attached to the color-combining incident surface 241 directly, a portion of the light guiding medium 22 is attached to the color-combining incident surface 242 directly, and a portion of the light guiding medium 23 is attached to the color-combining incident surface 243 directly.

Most of light emitted from the light source 11 is received by the light guiding medium 21 where it is refracted before entering the color-combining medium 24. Similarly, most of the light emitted from the light sources 12, 13 respectively is received by the light guiding media 22, 23 where it is refracted before entering the color-combining medium 24 respectively. Finally, the light from the three light sources 11, 12, 13 respectively are coupled by the color-combining medium 24 into the color-combining emergent surface 244 to be projected outside therefrom.

It should be noted that the action of the light guiding medium 21 and the color-combining medium 24 on the light source 11 is identical to that of the light guiding medium 22 and the color-combining medium 24 on the light source 12 as well as that of the light guiding medium 23 and the color-combining medium 24 on the light source 13 respectively. For purpose of simplicity, descriptions will only be made on how the light guiding medium 21 and the color-combining medium 24 acts on the light emitted from the light source 11. Based on these descriptions, the operations of light paths between the other light sources 12, 13, the light guiding media 22, 23 and the color-combining medium 24 respectively will be readily appreciated by those of ordinary skill in the art and thus will not be described again.

Figure 2:
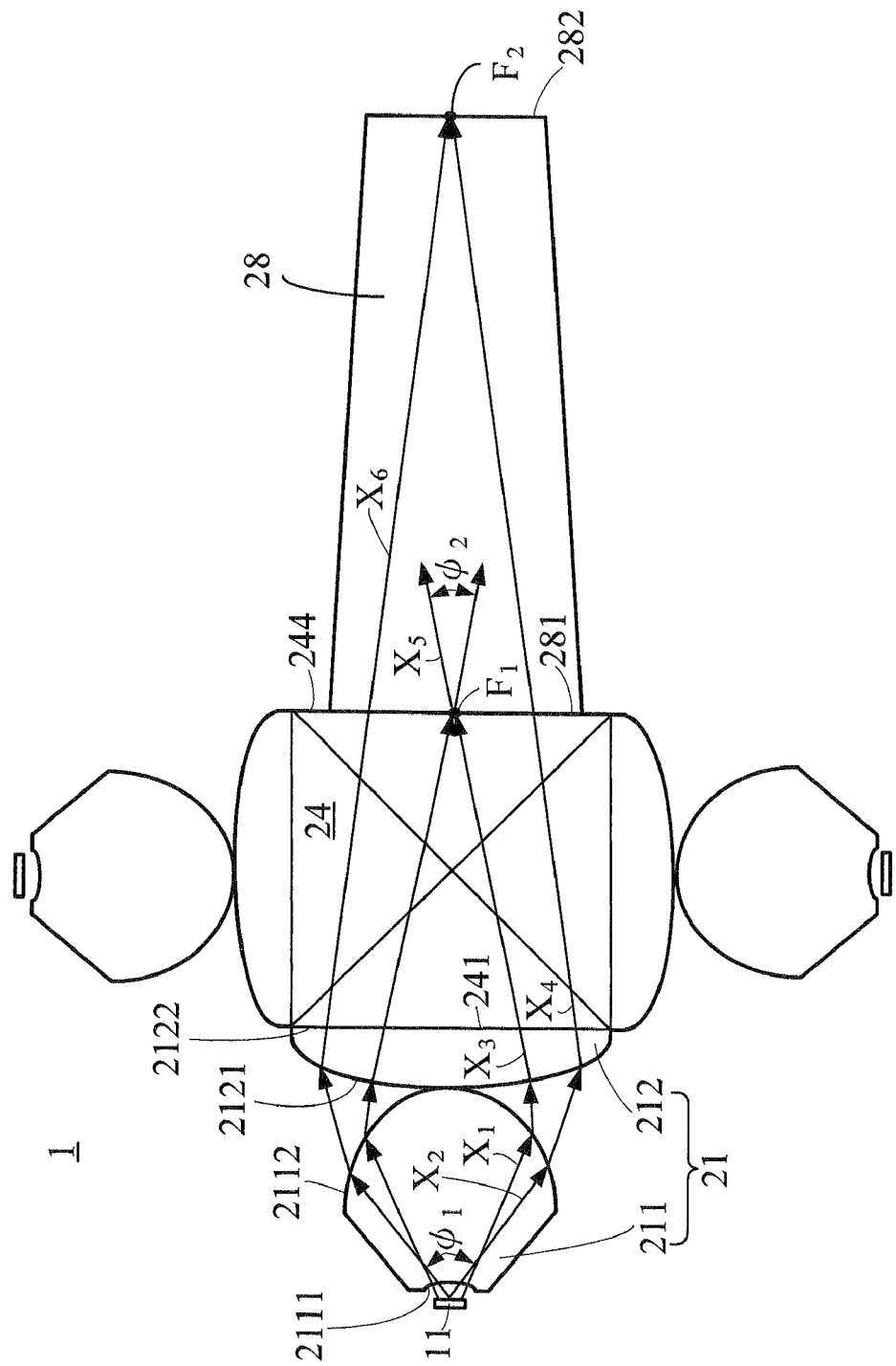
FIG. 2 is a schematic view of the preferred embodiment of a light source apparatus according to this invention.

In reference to FIG. 2, the light guiding medium 21 depicted therein comprises two lenses 211, 212 disposed between the light source 11 and the color-combining medium 24 in sequence along the light propagating direction. The lens 211 has an incident surface 2111 and a first light guiding surface 2112, while the other lens 212 has a second light guiding surface 2121 and an emergent surface 2122. More specifically, the lens 211 is disposed adjacent to the light source 11 with the incident surface 2111 arranged closely to the side of the light source 11 to receive and guide most of the incident light emitted from the light source 11. The emergent surface 2122 of the lens 212 is directly attached to the color-combining incident surface 241 of the color-combining medium 24.

In particular, the incident surface 2111 of the lens 211 is a three-dimensional concave surface with a negative curvature, and is used as the light divergent surface for diverging the incident light. On the other hand, the first light guiding surface 2112 of the lens 211 and the second light guiding surface 2121 of the lens 212 are each a convex surface with a positive curvature, and are used for converging the light. In contrast, the emergent surface 2122 of the lens 212 is flat and incurs no influence on the propagating direction of any light.

Furthermore, the incident light emitting from the light source 11 comprises a first light $X_1$ (i.e., a chief ray) and a second light $X_2$ (i.e., a marginal ray). The second light $X_2$ has an incident divergent angle φ1 which generally has a range of 120° (i.e., −60° to +60°). Upon the first light $X_1$ and the second light $X_2$ entering the lens 211 from the incident surface 2111 respectively, a third light $X_3$ and a fourth light $X_4$ will be emitted into the second light guiding surface 2121 via the first light guiding surface 2112 and then into the color-combining medium 24. Eventually, an emergent light comprising a fifth light $X_5$ and a sixth light $X_6$ is emitted from the color-combining emergent surface 244 of the color-combining medium 24.

Furthermore, since the light guiding incident surface 2111 is a light divergent surface and both the first and the second light guiding surfaces 2112 and 2121 are a light convergent surface, the parallel first light $X_1$ emitted from the light source 11 becomes slightly divergent through the incident surface 2111. The divergent effect of the first light $X_1$ may be simulated by light emitted from a pseudo light source located at the rear of the light source 11. The first light $X_1$ propagating through the incident surface 2111 then passes through the two convergent light guiding surfaces 2112, 2121 to be focused and is eventually imaged on the color-combining emergent surface 244 of the color-combining medium 24 as a color-combining focus $F_1$. Then, the fifth light $X_5$ is emitted from the color-combining focus $F_1$. On the other hand, the second light $X_2$ exhibiting a large incident divergent angle $φ_1$ emitted from the light source 11 also passes through the incident surface 2111, the first light guiding surface 2112 and the second light guiding surface 2121 to be refracted from a divergent light into a convergent light, and is eventually transformed into a slight parallel sixth light $X_6$ exiting from the color-combining emergent surface 244.

It should be noted that, in this embodiment, the light source 11 using LEDs has an incident area of 12 cm$^2$, while the color-combining emergent surface 244 has an emergent area of 300 cm$^2$. On the other hand, the fifth light $X_5$ in the emergent light is emitted from the color-combining medium 24 and exhibits an emergent divergent angle $φ_2$ with a range of about 24° (−12° to +12°), which is smaller than the incident divergent angle $φ_1$. Therefore, by comparing the incident light emitted from the light source 11 with the emergent light emitted from the color-combining emergent surface 244, it can be found that with the Etendue remaining unchanged, the incident light with a large divergent angle $φ_1$ and a small incident area is transformed by the light source transforming apparatus into the emergent light with a small divergent angle $φ_2$ and a large emergent area. The small divergent angle of the emergent light represents a slight load for a relay lens in the downstream light path, which is favorable for the design of the light path of the relay lens. Hence, by simply using lenses 2111, 2112, 2121 with a negative, a positive and a positive curvature respectively, the light source transforming apparatus of this invention can transform a light with a large divergent angle into a light with a small divergent angle within a very short distance, thus improving the utilization efficiency of the light source and miniaturize the projection apparatus.

The light source apparatus 1 of this invention further comprises a light integration apparatus 28. In particular, the light integration apparatus 28 of this embodiment is a taper light integration rod with a light integrated incident surface 281 and a light integrated emergent surface 282. The light integration apparatus 28 has a cross-sectional area tapering from the light integrated incident surface 281 towards the light integrated emergent surface 282 to facilitate the uniform mixture of the light. The light integrated incident surface 281 adjoins the color-combining emergent surface 244. The fifth and the sixth light $X_5$, $X_6$ exiting from the color-combining emergent surface 244 may enter the light integration apparatus 28 through the light integrated incident surface 281. It should be noted that, due to the light converging effect of the light source transforming apparatus of this invention, the emergent light comprising the fifth and the sixth light $X_5$, $X_6$, when converging on the color-combining emergent surface 244, actually only occupies a portion of the area of the color-combining emergent surface 244. As a result, the light integration apparatus 28 adjoining the color-combining emergent surface 244 can be shrunk, i.e., the light integrated incident surface 281 can be made smaller in area than the color-combining emergent surface 244, which is favorable for obtaining uniform light in the light integration apparatus 28. Additionally, the sixth light $X_6$ entering the light integration apparatus 28 is preferably converged at a light integrated focus $F_2$ on the light integrated emergent surface 282.

Due to the miniaturization of light source apparatus of this invention, the heat dissipation becomes more difficult. If the heat dissipation problem of the light source can not be solved effectively, it would be impossible for the aforesaid miniaturized projection apparatus to operate over an extended period of time, thus making the apparatus impractical. To solve this problem, a heat-dissipation module must be used in the light source apparatus of this invention to assist in heat dissipation, which will be described as follows.

Figure 3:
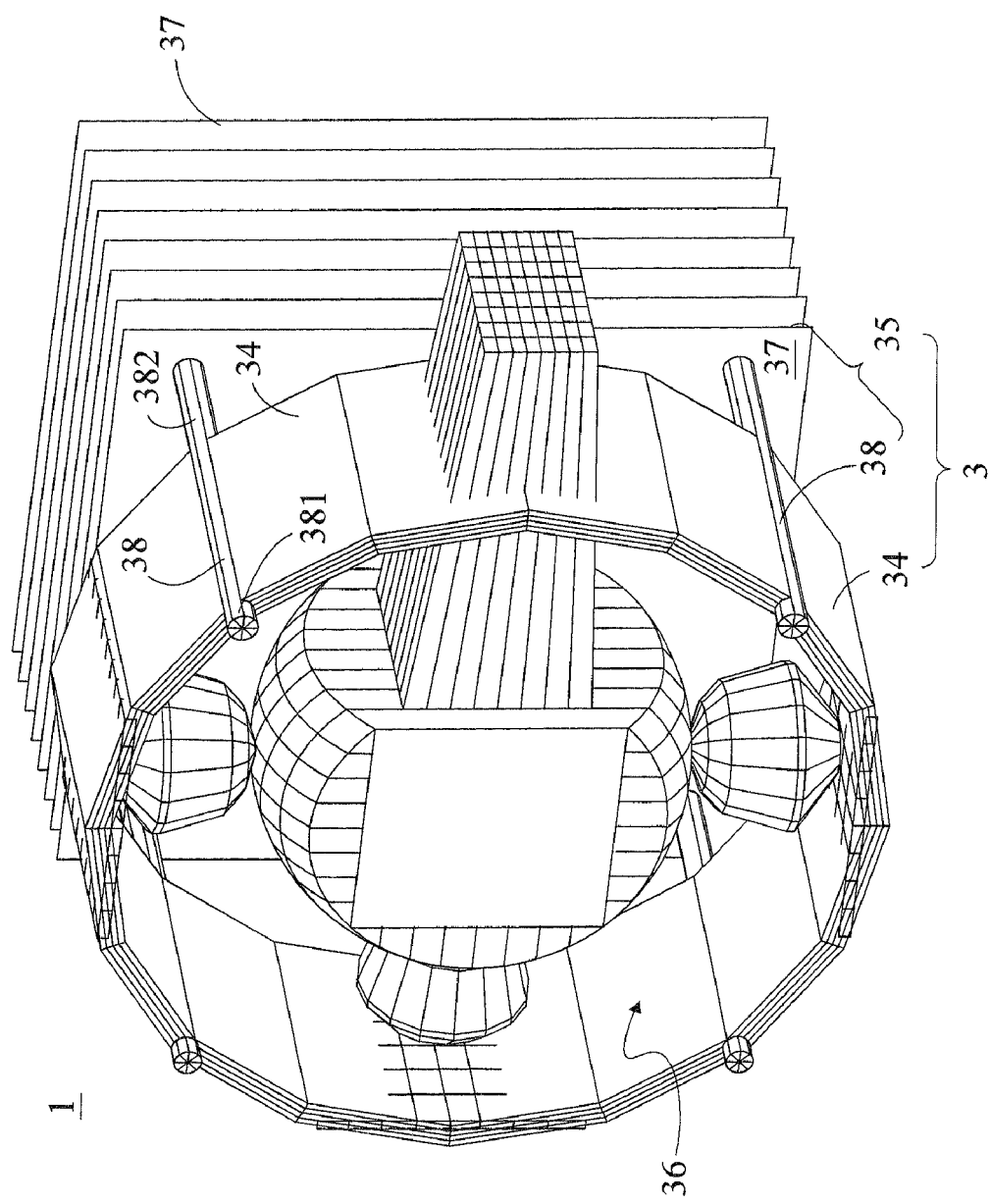
FIG. 3 is a schematic view of the heat-dissipating module in a light source apparatus according to this invention.

In reference to FIG. 3, a heat-dissipation module for use in a light source apparatus according to this invention is depicted therein. The heat-dissipation module 3 of the light source apparatus 1 according to this invention has a base 34 and a heat dissipation platform 35. The base 34 may be formed of a metal material with good heat conductive performance, e.g., copper, although it is not merely limited thereto. The base 34 is characterized in that it has an annular wall structure which integrates the heat dissipation function and the light source frame together. Aside from providing heat dissipation for the three light sources 11, 12, 13, the annular wall structure of the base 34 may also serve as a base to install these light sources, thus eliminating the use of an additional frame for installing the light sources. The annular base structure of the base 34 defines a containing space 36 adapted to contain the light source transforming apparatus, which comprises the three light guiding media 21, 22, 23 and the color-combining medium 24, altogether therein. Since the annular wall structure of the base 34 provides a thermally conductive common base that exactly accommodates the three light sources 11, 12, 13, heat generated by the red, the blue and the green light sources is substantially dissipated uniformly through the common heat conduction effect of the base 34 and the light emitting efficiency of respective light sources is increased.

The base 34 is disposed on the heat dissipation platform 35 so that heat generated by the light sources 11, 12, 13 is transferred from the base 34 to the heat dissipation platform 35 and further to the outside therefrom. In particular, the heat dissipation platform 35 comprises a plurality of heat dissipation sheets 37 arranged in parallel and a plurality of heat pipes 38 connected in series with the heat dissipation sheets 37. In this embodiment, the heat dissipation sheets 37 and the heat pipes 38 may be made of a metal material with good heat conduction performance, e.g., copper, although it is not merely limited thereto.

The heat dissipation sheets 37 may be spaced apart from each other by an appropriate distance to enlarge the heat-dissipating area. In addition, each of the heat pipes 38 has two opposite ends, and a first end 381 is embedded in the base 34 and a second end 382 is embedded in the heat dissipation sheets 37. It follows from the above description that by using the light source transforming apparatus, the light source apparatus of this invention can converge light with a large divergent angle within a very short distance to improve the utilization efficiency of the light source and overcome the problem of a large divergent angle. This may not only provide a light source of better quality for convenient use in the downstream light path, but also allow for the miniaturization of the projection apparatus by appropriately arranging the light source transforming apparatus and the heat-dissipation module.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source apparatus, comprising:
   at least one light source, adapted to provide a first light and a second light; and
   at least one light guiding medium, having an incident surface, a first light guiding surface and a second light guiding surface, the incident surface being a light divergent surface and configured to be adjacent to the at least one light source, the first light guiding surface and the second light guiding surface being light convergent surfaces, the first light and the second light entering the at least one light guiding medium from the incident surface, and a third light and a fourth light being emitted from the second light guiding surface via the first light guiding surface; and
   a color-combining medium, having at least one color-combining incident surface and a color-combining emergent surface, a color-combining focus being formed on the color-combining emergent surface after the third light enters the color-combining medium from the color-combining incident surface, and a fifth light being emitted from the color-combining focus, wherein the fourth light is emitted into the color-combining medium from the color-combining incident surface, and a sixth light is emitted from the color combining emergent surface.

2. The light source apparatus as claimed in claim 1, wherein the at least one light source is a light-emitting diode.

3. The light source apparatus as claimed in claim 1, wherein the at least one light source is one of a red light source, a blue light source, and a green light source.

4. The light source apparatus as claimed in claim 1, wherein
   the light divergent surface is a concave surface, and the light convergent surface is a convex surface, wherein a curvature of the concave surface is negative, and a curvature of the convex surface is positive.

5. The light source apparatus as claimed in claim 1, wherein the second light has an incident divergent angle and an incident area relative to the incident surface, and the fifth light has an emergent divergent angle and an emergent area relative to the color-combining emergent surface, and the incident divergent angle is bigger than the emergent divergent angle and the incident area is smaller than the emergent area.

6. The light source apparatus as claimed in claim 1, further comprising a heat-dissipating modular, including:

a base, defining a containing space, the at least one light source being configured on the base, the color-combining medium being configured in the containing space; and a heat-dissipating platform, the base being configured on the heat-dissipating platform, wherein the base transfers the heat generated by the at least one light source to the heat-dissipating platform and dissipates the heat outside by the heat-dissipating platform.

7. The light source apparatus as claimed in claim 6, wherein the heat-dissipating platform further comprises:
   a plurality of heat dissipation sheets, the heat dissipation sheets being configured parallel; and
   a plurality of heat pipes, wherein a first end of each of the heat pipes is embedded in the base, and a second end of each of the heat pipes is embedded in the heat dissipation sheets.

8. The light source apparatus as claimed in claim 1, wherein the at least one light source comprises a plurality of light sources.

9. The light source apparatus as claimed in claim 8, wherein the light sources comprise a red light source, a blue light source, and a green light source.

10. The light source apparatus as claimed in claim 9, wherein the light sources are light-emitting diodes.

11. The light source apparatus as claimed in claim 1, further comprising a light integration apparatus, having a light integrated incident surface and a light integrated emergent surface, wherein the light integrated incident surface is attached to the color-combining emergent surface, and an area of the light integrated incident surface is smaller than an area of the color-combining emergent surface.

12. The light source apparatus as claimed in claim 11, wherein the light integration apparatus is a taper light integration rod.

13. The light source apparatus as claimed in claim 12, wherein a light integrated focus is formed on the light integrated emergent surface after the sixth light enters the taper light integration rod from the light integrated incident surface.

14. A light source transforming apparatus, adapted to receive an incident light and then transforming the incident light to be emitted into a light integration apparatus, wherein the incident light has an incident divergent angle, the light source transforming apparatus comprising:
   a light source, having an incident area;
   a light guiding medium, being adjacent to the light source and being adapted to receive and guide the incident light, having an incident surface, a first light guiding surface, a second light guiding surface, and a light guiding emergent surface, wherein the incident surface is a light divergent surface, and the first light guiding surface and the second light guiding surface are light convergent surfaces; and
   a color-combining medium, being adjacent to the light guiding medium, having at least one color-combining incident surface and a color-combining emergent surface, the at least one color-combining incident surface being attached to the light guiding medium, the incident light guided by the light guiding medium being emitted into the at least one color-combining incident surface, a emergent light being emitted from the color-combining emergent surface and entering the light integration apparatus, the emergent light having an emergent divergent angle, the color-combining emergent surface having a emergent area, wherein the incident divergent angle is bigger than the emergent divergent angle and the incident area is smaller than the emergent area.

15. The light source transforming apparatus as claimed in claim 14, wherein the incident surface is adjacent to the light source, and the color-combining medium is attached to the light guiding emergent surface.

16. The light source transforming apparatus as claimed in claim 14, wherein the light divergent surface is a concave surface, and the light convergent surface is a convex surface, and a curvature of the concave surface is negative, and a curvature of the convex surface is positive.

17. The light source transforming apparatus as claimed in claim 14, wherein the color-combining medium is a Dichroic Minor.

18. The light source transforming apparatus as claimed in claim 17, wherein the Dichroic Mirror is a color-combining prism.

19. The light source transforming apparatus as claimed in claim 17, wherein the Dichroic Mirror is an X-Plate.

20. The light source transforming apparatus as claimed in claim 17, wherein the Dichroic Mirror is an X-Cube.

21. A light source transforming apparatus, comprising:
a light guiding medium, having an incident surface, a first light guiding surface, a second light guiding surface, and a light guiding emergent surface, wherein the incident surface is a light divergent surface, and the first light guiding surface and the second light guiding surface are light convergent surfaces;
a color-combining medium, being adjacent to the light guiding medium, having at least one color-combing incident surface and a color-combining emergent surface, the at least one color-combining incident surface being attached to the light guiding medium; and
a light integration apparatus, being adjacent to the color-combining medium, having a light integrated incident surface and a light integrated emergent surface, wherein the light integrated incident surface is attached to the color-combining emergent surface, and an area of the light integrated incident surface is smaller than an area of the color-combining emergent surface.

* * * * *